United States Patent

Armbruster

[11] Patent Number: 5,231,727
[45] Date of Patent: Aug. 3, 1993

[54] TORSION HANDLE POLISHER

[76] Inventor: Joseph M. Armbruster, 4700 NE. 47th St., Lighthouse Point, Fla. 33064

[21] Appl. No.: 838,862

[22] Filed: Feb. 21, 1992

[51] Int. Cl.$^5$ .......................... B24B 29/02; B60S 3/06
[52] U.S. Cl. ........................................ 15/97.1; 15/28; 15/144.1; 16/110 R; 51/170 MT; 51/170 T; 81/489
[58] Field of Search ............... 15/22.1, 22.2, 28, 29, 15/97.1, 49.1, 50.1, 144.1; 51/170 R, 170 MT, 170 T, 170 TL; 81/489; 16/110 R, 114, 112

[56] References Cited

U.S. PATENT DOCUMENTS

| 700,642 | 5/1902 | Hanford | 51/170 T |
|---|---|---|---|
| 5,031,363 | 7/1991 | Thiem | 51/170 T |

FOREIGN PATENT DOCUMENTS

556066  7/1923  France ................. 51/170 T

*Primary Examiner*—Edward L. Roberts
*Attorney, Agent, or Firm*—Jacobson, Price, Holman & Stern

[57] ABSTRACT

A torsion handle polisher in which a motor housing is provided with a pair of diametrically opposed, aligned outwardly extending torsion handles oriented in aligned relation and in perpendicular relation to the rotatable axis of the motor and polishing bonnet which is randomly orbited in relation to the motor housing. An arcuate slide arrangement is provided for actuating a motor switch enabling effective operation by left and right handed individuals with equal facility. The torsion handles can rotate with a limited degree of resistance to rotation to enable the polisher to readily move to various angular positions while the hands and arms of the operator of the polisher remain in the same angular relation to each other as the torsion handles rotate in relation to the motor housing. The torsion handles include embodiments with frictional resistance and resilient resistance which includes a spring loaded mechanism that will return the handle grip to a neutral or center position which allows the operator to pickup the polisher and place both hands on the handle grips without aligning one grip in relation to the other so that the operator always starts with both grips in the same position.

19 Claims, 4 Drawing Sheets

TORSION HANDLE POLISHER

BACKGROUND OF THE INVENTION

1. Field of the Invention

The present invention generally relates to a handheld random orbit polisher and more specifically a torsion handle polisher in which a motor housing is provided with a pair of diametrically opposed, aligned outwardly extending torsion handles oriented in aligned relation and in perpendicular relation to the rotatable axis of the motor and polishing bonnet which is randomly orbited in relation to the motor housing. An arcuate slide arrangement is provided for actuating a motor switch enabling effective operation by left and right handed individuals with equal facility. The torsion handles can rotate with a limited degree of resistance to rotation to enable the polisher to readily move to various angular positions while the hands and arms of the operator of the polisher remain in the same angular relation to each other as the torsion handles rotate in relation to the motor housing. The torsion handles include embodiments with frictional resistance and resilient resistance which includes a spring loaded mechanism that will return the handle grip to a neutral or center position which allows the operator to pickup the polisher and place both hands on the handle grips without aligning one grip in relation to the other so that the operator always starts with both grips in the same position. The torsion handles include a torsion strip and spring arrangements as well as a friction arrangement with stops to limit pivotal movement or optionally to enable 360° rotational movement of the handles. This structure enables the operator to polish a horizontal surface such as the hood of a vehicle and move the polisher across a horizontal hood and go right down the vertical side of a fender or the like without the necessity of lifting and positioning the polisher to keep the polishing bonnet in contact with the surface. This movement is automatically accomplished and the operators wrist stays in alignment with his arm during movement between horizontal and vertical surfaces.

2. Description of the Prior Art

There is commercially available handheld and manipulated polishers which have a random orbit drive to a polishing bonnet. Presently available commercial polishers include rigid arcuate or circular handle structures mounted peripherally of a motor housing with a trigger switch being provided to control operation of the motor. Use of such devices can result in an operator developing carpal tunnel syndrome resulting from excessive twisting of the joints and bones in the arm and hand of the operator and increases fatigue of the operator as a result of maintaining a firm grip on the rigid handle structure when using the polisher. The following U.S. patents disclose various developments relating to this field of endeavor.

U.S. Pat. No. 2,443,023
U.S. Pat. No. 3,775,911
U.S. Pat. No. 4,330,967
U.S. Pat. No. 4,683,682
U.S. Pat. No. 4,731,894

The prior art patents do not disclose torsion handle structures of the present invention in which diametrically opposed handles are mounted on a motor housing in a manner to permit them to rotate thereby permitting the operator to keep their arms and wrists in alignment regardless of the attitude of the surface being polished with the handle rotation facilitating polishing when moving from a horizontal to a vertical surface by eliminating the necessity for the operator to align the polisher pad or bonnet with the surface being polished. The handles in this invention enable the motor and polisher pad to rotate as necessary to permit the polishing pad bonnet to always be in total contact with the surface being polished thereby eliminating the pad or bonnet from getting on edge or having only partial contact with the surface which results in chatter, bounce and swirl marks being formed. These problems are eliminated by the handle structure of the present invention in which the floating characteristics of the motor and pad or bonnet enables the pad or bonnet always to be in correct alignment with the surface being polished.

In addition, the prior art does not disclose a slide switch assembly in which the operator can turn the polisher on or off with either the left or right thumb with equal facility thereby giving the operator total control and access to the control switch while the hands firmly grasp the handles which due to the structure of the slide switch assembly provides equally effective operator control regardless of whether the operator is left or right handed.

SUMMARY OF THE INVENTION

An object of the present invention is to provide a torsion handle polisher having a pair of diametrically opposed torsion handles attached to a motor housing and extending radially therefrom in diametrically opposed alignment and in generally perpendicular relation to the rotational axis of the drive motor and the polishing pad and bonnet driven in a random orbit path by the motor.

Another object of the invention is to provide a torsion handle polisher in accordance with the preceding object in which the torsion handles include a rotatable handgrip supported from the motor housing for rotation about a longitudinally extending axis whereby the motor and pad and polishing bonnet can follow the contour of a surface being polished from a generally horizontal surface to a generally vertical surface while maintaining the pad and polisher bonnet in contact with and in alignment with the surface being polished to reduce or eliminate chatter of the pad and bonnet, edge engagement with the surface being polished and resultant swirl marks in the surface being polished.

A further object of the invention is to provide a torsion handle polisher as set forth in the preceding objects in which the handles are optionally rotatable 360° or provided with a stop and include resistance to rotation which is a relatively light resistance with optional embodiments of the invention including spring loaded mechanisms to lightly resist rotation and to cause the handles to assume a neutral or center line position when released.

Still another object of the invention is to provide a torsion handle polisher in accordance with the preceding objects in which a slide switch assembly is associated with the diametrically opposed handles so that a switch actuator is equally accessible and operable by left and right hand users with the structure also enabling one hand manipulation and control which facilitates polishing in certain areas that are difficult to reach when both handles are within the grasp of the operator.

A still further object of the invention is to provide a torsion handle, random orbit polisher which can be operated with less fatigue and with the hands, wrists and arms oriented in the same generally straight line relative positions regardless of whether a horizontal, angulated or vertical surface is being polished thereby reducing fatigue and reducing the incidence of carpal tunnel syndrome.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Referring now specifically to the drawings, the torsion handle polisher of the present invention is generally designated by reference numeral 30 in FIGS. 1, 18, 19 and 21 and includes a motor housing 32 having an upper or top surface 34 provided with ventilation openings 36. A power supply cord 38 having a male plug on its free end is connected to the top 34 of the housing 32 with a tension relief and swivel arrangement 40. A torsion handle generally designated by reference numeral 42 extends laterally outwardly from each side of the housing and a slide switch assembly generally designated by reference numeral 44 is incorporated into the housing 32 and a motor internally of the housing 32 drives a polishing pad 46 and bonnet 48 mounted thereon in a random orbit pattern. The drive motor and random orbit drive arrangement including the weight assembly are conventional and well known with the present invention involving the torsion handle 42 and the slide switch assembly 44 and their relation to the remainder of the random orbit polisher.

FIGS. 2-5 illustrate the structural details of the torsion handle 42 with it being pointed out that the pair of torsion handles 42 are diametrically opposed and in horizontal alignment with each other and the housing 32 is provided with a generally flat surface or boss 50 provided with an aperture 52 having the metal insert 54 therein which is internally threaded for receiving an externally threaded stud 56 which rigidly affixes the handle 42 to the housing 32.

The handle 42 includes a solid plug 58 having an internally threaded bore 60 which receives the outer end of the threaded stud 56. A jam nut 62 is provided on the threaded stud 58 between the plug 58 and the housing 32 thus rigidly and screw threadedly connecting the plug 58 to the housing 32. Mounted on the solid plug 58 is an inner tube 64 which is rigidly connected to the plug 58 by a transverse spring pin 66 such as a roll pin which extends through the inner tube 64 and a transverse bore 68 in the plug 58 with the pin also extending through a longitudinal transverse slot 70 in the outer end of the plug 58 with the slot 70 being in perpendicular relation to the bore 68 as illustrated in FIGS. 2 and 3.

Figures 1, 2, 4:
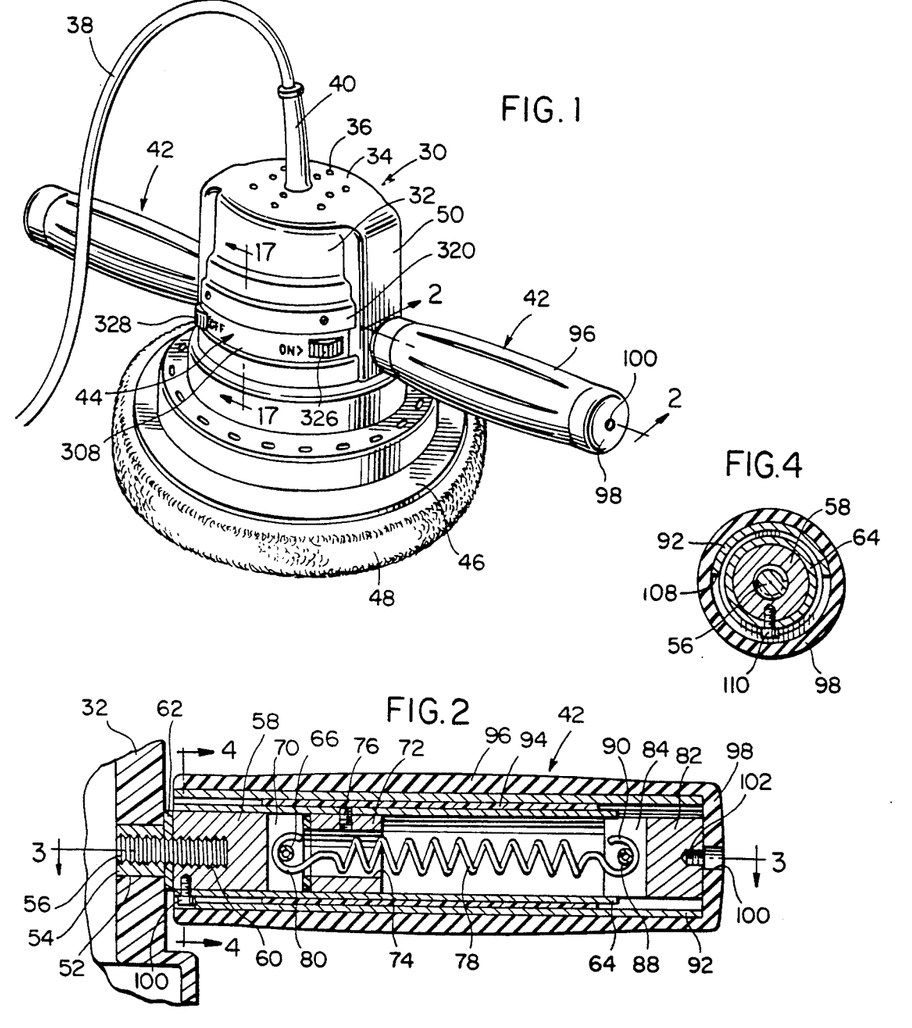
FIG. 1 is a perspective view of the torsion handle polisher of the present invention.
FIG. 2 is a longitudinal sectional view of one of the torsion handles taken along section line 2—2 on FIG. 1, on an enlarged scale, illustrating specific structural details of the handle structure.
FIG. 4 is a transverse sectional view taken along section line 4—4 on FIG. 2 illustrating further structural details of this embodiment of the invention.
Figure 3:
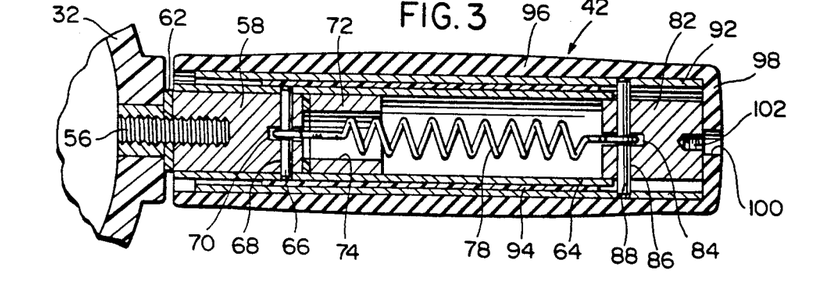
FIG. 3 is a longitudinal sectional view taken along section line 3—3 on FIG. 2 illustrating further structural details of the handle structure.

A cylindrical bearing plug 72 is mounted internally of the tube 64 with the bearing plug 72 including a longitudinal bore 74 extending therethrough with a nylon or other plastic washer 76 being positioned between the outer end of the plug 58 and the inner end of the bearing plug 72 as illustrated in FIGS. 2 and 3. An externally threaded pin or set screw 76 secures the bearing plug 72 to the inner tube 64 as illustrated in FIG. 2. A torsion spring 78 extends lengthwise in the inner tube 64 and through the bore 74 with one hook end 80 of the spring being hooked onto and around the transverse spring pin 66.

At the outer end of the inner tube 64, a solid tail plug 82 is telescoped partially into the end of the inner tube 64 with the tail plug 82 including a transverse slot 84 and a transverse bore 86 in perpendicular relation thereto to receive a spring pin 88 such as a roll pin which is engaged by the outer hook end 90 of the spring 78. An outer metal tube 92 is positioned in enclosing concentric relation to the inner tube 64 and extends longitudinally beyond the outer end of the inner tube 64 with the roll pin 88 extending through the outer tube 92 as illustrated in FIG. 3 thus rigidly securing the tail plug 82 to the outer tube 92. Thus, the torque spring 78 permits resilient relative rotation between the inner tube 64 and the outer tube 92 as one end of the spring 78 can rotate in relation to the other to a limited degree with the bearing plug 72 forming a support for several convolutions of the spring 78. As illustrated in FIGS. 2-4, the outer tube 92 is concentrically spaced from the inner tube 64 a small distance with a plastic sleeve 94 forming a sleeve bearing between the tubes 64 and 92 in order to facilitate rotation and stabilize the tubes in relation to each other. Mounted externally on the outer tube 92 is a handgrip 96 constructed of rubber, plastic or the like of any suitable color with the handgrip being bonded to the outer tubular member 92 by any suitable adhesive or bonding agent. The outer end of the handgrip 96 is closed as at 98 and provided with an access opening 100 to an internally threaded bore 102 in the end of the tail plug 82 which enables a tail plug pull tool to be threaded into the bore 102 to move the plug 82 outwardly during assembly or disassembly of the components of the handle.

Figure 5:
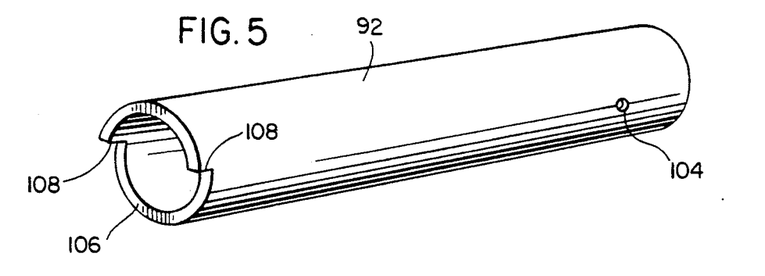
FIG. 5 is a perspective view of a tubular member forming a portion of the handle structure in FIGS. 1-4 illustrating the end of the tube which forms a stop structure to limit the rotational movement of the handle in relation to the motor housing.

FIG. 5 illustrates the details of the outer tube 92 which includes apertures 104 for the ends of the spring pin 88 and a notched inner end 106 providing longitudinally extending shoulders 108 for engagement by a stop pin 110 which is threaded into the solid stud plug 58 with the head of the stop pin 110 being received in the recessed edge 106 and engaging the shoulders 108 to limit the rotational movement of the handgrip 96 and outer tube 92 about the longitudinal axis of the handle. The spring 78 in this embodiment of the invention is a straight wound coil spring in which a resistance to rotation of the handgrip and outer tube is provided in both directions of rotation. However, the spring 78 does not exert enough force to interfere with the floating action when the operator moves from a horizontal to a vertical surface. The stop pin 110 limits the angle of movement of the handgrip and outer tube and the spring 78 returns the handle to a center or neutral position automatically when the operator removes his hands from the handles.

Figure 6:
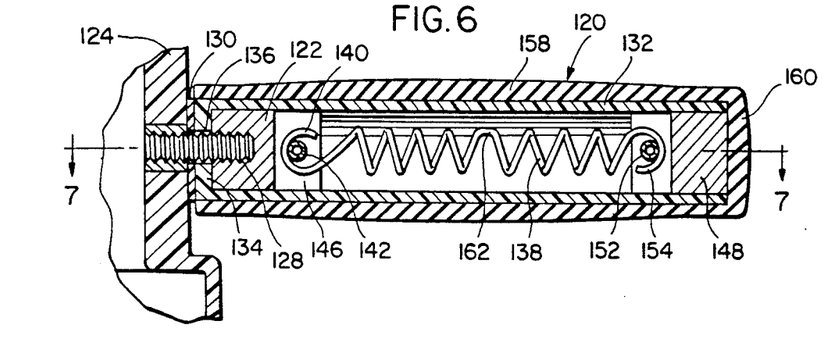
FIG. 6 is a longitudinal, sectional view of another embodiment of torsion handle utilized on opposite sides of the motor housing.
Figure 7:
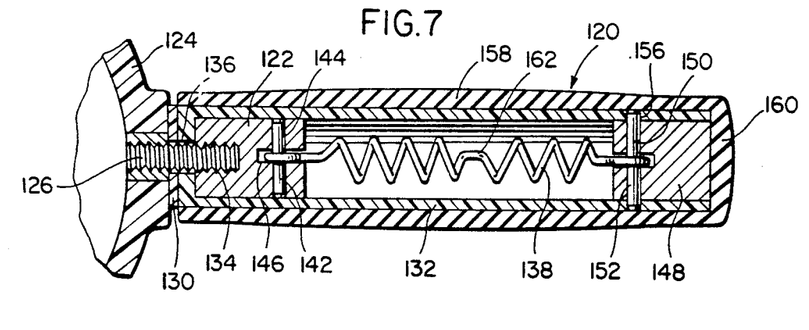
FIG. 7 is a longitudinal, sectional view taken along section line 7—7 on FIG. 6 illustrating further structural details of this embodiment of the invention.

FIGS. 6 and 7 illustrate a simplified form of the invention in which the handle is generally designated by reference numeral 120 and includes a solid stud plug 122 secured to the motor housing 124 by a stud 126 which is threaded into a bore 128 in the plug 122 with a nylon washer 130 being provided between the handle and the motor housing. In this construction, a plastic handle sleeve 132 extends over and closely receives the plug 122 with the inner end of the tube 132 extending inwardly at 134 to closely fit but not be attached to the stud 128 with the end wall including an aperture 136 receiving the stud 128. A torsion coil spring or torque spring 138 is positioned longitudinally in the tube 132 with the inner hook end 140 engaged over a roll pin or spring pin 142 extending transversely in a bore 144 in the plug 122 with the pin 142 also extending through a slot 146 perpendicular to the bore 144 to anchor the spring to the plug 122 which is rigidly affixed to the motor housing 124. The other end of the spring is connected to a tail plug 148 having a transverse bore 150 therein receiving a spring pin or roll pin 152 which is engaged by the outer hook end 154 of the spring 138. The spring pin 150 also extends through apertures 156 in the tube or sleeve 132 thus anchoring the tail plug 148 to the tube 132 for rotation therewith. A handgrip 158 is mounted on the tube 132 with the outer end of the hand grip being closed by end wall 160. Thus, this construction enables the handgrip 158 and tube 132 as well as the tail plug 148 and hook end 154 of the spring 138 to rotate in relation to the housing 124, plug 122 and hook end 140 of the spring 138 whereby the spring resists rotation of the handgrip 158 in both directions of rotational movement. As illustrated, the spring 138 includes convolutions in opposite directions with a central connecting portion 162 which provides for equal resistance to rotation in both directions of movement. The coil spring may be a spring having a coil winding in which all the convolutions are in the same direction or the convolutions may be one-half in direction and one-half in the other to assure that the resistance to rotation will be the same in both directions and the bearing plug as illustrated in FIGS. 2-5 may be used in FIGS. 6 and 7 to provide further stability and support for the spring.

Figures 8, 9:
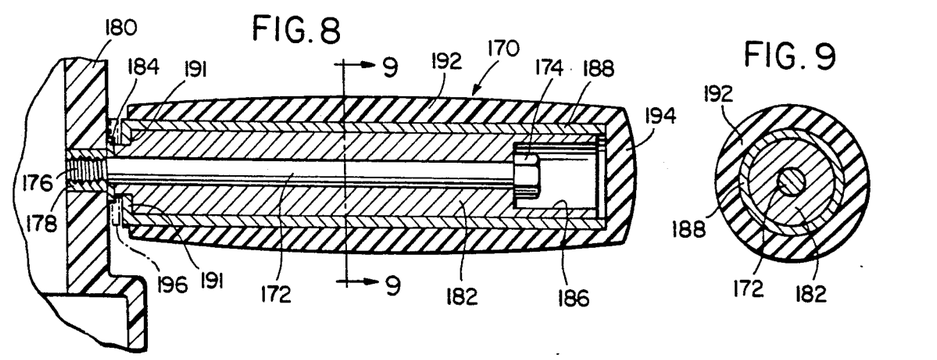
FIG. 8 is a longitudinal, sectional view illustrating a form of the invention in which the handle grip can rotate 360° with an optional friction disc being provided to resist rotational movement.
FIG. 9 is a transverse, sectional view taken substantially upon a plane passing along section line 9—9 on FIG. 8 illustrating further structural details of this embodiment of the invention.

FIGS. 8 and 9 illustrate the simplest form of handle 170 which includes a central longitudinal bolt 172 having a head 174 at its outer end and a threaded inner end 176 which is screw threaded into the internally threaded insert 178 in the motor housing 180. Thus, the bolt 172 is rigid and fixed with respect to the housing 180 and securely mounts a cylindrical handle member 182 to the housing 180 with a lock washer 184 being provided therebetween to securely lock the bolt 172 and cylindrical body 164 in position. The outer end of the cylindrical body or handle 182 is provided with a recess 186 which receives the head 174 of the bolt 172. An outer tube 188 is mounted on the handle member 182 for rotational movement with the inner end of the tube 188 including an inturned end portion 190 received in a peripheral notch 191 in the inner end of the handle member 182 which spaces the inturned end 190 from the motor housing 180 thus enabling rotation of the outer tube on the cylindrical handle member 182. A handgrip 192 is fixed to the outer tube 188 and includes a closed outer end 194 which conceals the end of the tube 188, the cylindrical handle member 182 and the bolt head 174. This structure enables rotational movement of the handgrip without any limit stop although a limit stop can be provided and an optional friction washer 196 may be provided between the lock washer 184 and the surface of the housing 180 and the inturned end 190 on the outer tube 188 to provide a resistance to rotation in both rotational directions of the handgrip 192.

Figures 10, 11, 12, 13, 14, 15, 16:
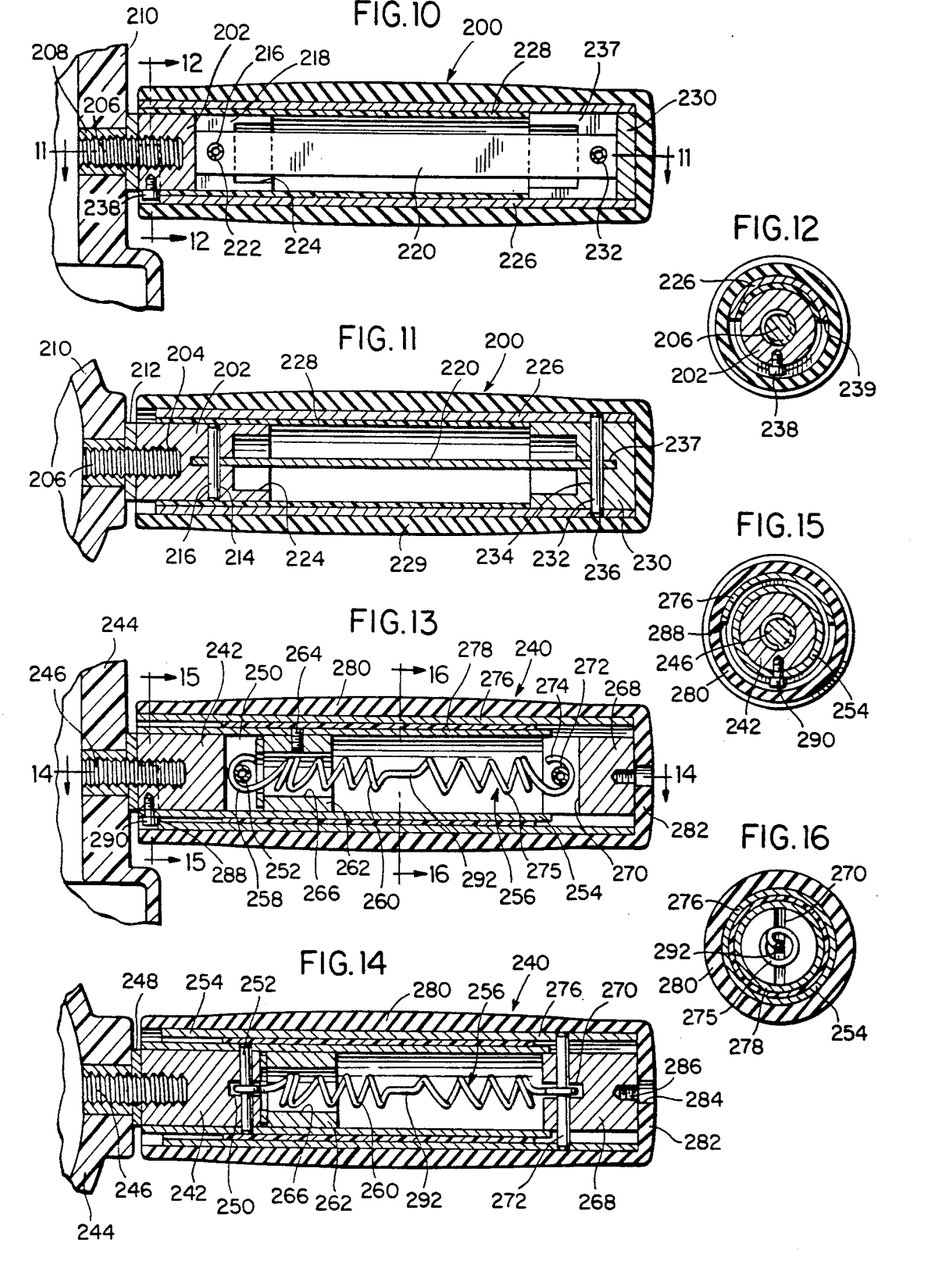
FIG. 10 is a longitudinal, sectional view of a handle illustrating the use of a torsion strip to lightly resist rotation and return the handle grip to a neutral or center line position.
FIG. 11 is a longitudinal, sectional view taken along section line 11—11 on FIG. 10 illustrating further structural details of this embodiment of the invention.
FIG. 12 is a transverse, sectional view taken substantially upon a plane passing along section line 12—12 on FIG. 10 illustrating further structural details of this embodiment of the invention.
FIG. 13 is a longitudinal, sectional view illustrating another embodiment of spring structure utilized in the torsion handle.
FIG. 14 is a longitudinal, sectional view taken substantially upon a plane passing along section line 14—14 on FIG. 13 illustrating further structural details of this embodiment of the invention.
FIG. 15 is a transverse, sectional view taken substantially upon a plane passing along section line 15—15 on FIG. 13 illustrating further structural details of the attachment structure for the handle illustrated in FIG. 13.
FIG. 16 is a transverse, sectional view taken substantially upon a plane passing along section line 16—16 on FIG. 13 illustrating further structural details of this embodiment of the invention.

FIGS. 10-12 illustrate another embodiment of spring loaded torsion handle 200 which includes a stud plug 202 at the inner end thereof provided with a bore 204 receiving a threaded stud 206 which is also threaded into an internally threaded insert 208 in the motor housing 210 with a lock nut or jam nut 212 positioned between the plug 202 and the housing 210 to securely lock the inner stud plug 202 to the housing 210. The outer end of the stud plug 202 includes a transverse bore 214 receiving a spring pin or roll pin 216 therethrough. The inner end of the stud plug 202 is also provided with a slot 218 in perpendicular relation to the bore 214 to receive one end of the a strip-type torsion spring 220 which has an end aperture 222 receiving the spring pin 216 thus locking the inner end of the torsion strip spring 220 to the stud plug 202. The outer end of the stud plug 202 is provided with a recess or cavity 224 which receives a portion of the strip spring or torsion strip 220. An outer metal tube 226 is rotatably journaled on the stud plug 202 with a plastic sleeve 228 positioned internally of the outer tube 226 and extending between and forming a bearing between the outer tube 226 and the stud plug 202. A handgrip 229 is bonded to tube 226. At the outer end of the tube 226, a tail plug 230 is provided within the tube 226 and includes a spring pin or roll pin 232 extending through a bore 234 therein and also extending through apertures 236 in the outer tube 226 to secure the tail plug 230 to the outer tube 226. The tail plug also includes a transverse slot 237 which receives the end of the torsion strip or spring thus anchoring the outer end of the torsion strip or spring to the outer tube 226 thus rotatably connecting the outer tube 226 to the stud plug 202 through the tail plug 230. A stop pin 238 rigid with plug 202 is received in arcuate notch 239 in the inner end of tube 226.

The embodiment of the handle structure illustrated in FIGS. 13-16 is generally designated by reference numeral 240 and is similar in construction and operation to the embodiment of the handle illustrated in FIGS. 2-5 and includes a stud plug 242 secured to the motor housing 244 by a threaded stud 246 with a lock nut or jam nut 248 positioned therebetween. The plug 242 is provided with a slot 250 with a spring or roll pin 252 extending therethrough and into and through an inner tube 254 thus stationarily mounting the plug 242 and inner tube 254. A torque spring generally designated by reference numeral 256 has a hook end 258 engaged over the pin 252 with one portion of spiral convolutions 260 received in a bearing plug 262 secured to the tube 254 by a pin or set screw 264. The bearing plug 262 includes a longitudinal bore 266 receiving several convolutions of the spiral coil portion 260. An outer tail plug 268 is also provided with a transverse slot 270 which receives a transverse spring pin or roll pin 272 which receives the hooked end 274 on a spiral coil portion 275 of the spring 256. The transverse pin 272 extends through an outer metal tube 276 which is concentric with the inner metal tube 254 and rotatably supported therefrom by a plastic sleeve 278. As illustrated in FIGS. 13 and 14, the inner tube 254 terminates inwardly of the transverse pin 272 with the end of the plug 268 received in the outer end of the inner tube 254. The outer tube extends to the outer end of the plug 268 and a handgrip 280 is mounted on the outer tube 276 and is secured thereto by adhesive or other bonding techniques. The outer end of the handgrip 280 is provided with an end wall 282 having an opening therein designated by reference numeral 284 to provide access to an internally threaded bore 286 in the plug 268 to receive a tail plug pull tool. The outer tube 278 is provided with a notch 288 in the inner end thereof for receiving the head of a handle stop stud 290 with the arcuate extent of the notch 288 defining the degree of movement of the outer tube 27 about its longitudinal axis in relation to the inner tube 254 in a manner similar to the structure illustrated in FIG. 5. The torque spring 256 includes coil portions 260 and 275 which are spiraled in opposite directions with the center of the spring including a connector 292 which is a continuation of the wire spring with this structure differing from the torsion spring in FIGS. 2 and 3 by providing equal resistance to rotation of the handgrip in either direction rather than the coil spring winding and unwinding during opposite rotation in the construction of FIGS. 2-5.

The spring loaded handle for the circular random orbit handheld polisher allows the operator to pickup the machine, placing both hands on the grips without aligning one grip to the other. The handles can rotate in a clockwise and counterclockwise direction up to 95° in each direction. When the operator removes his hands from the handle, the spring loaded mechanism returns the handle grip to a neutral or center position so that the operator always starts with both grips in the same position.

Figures 17, 18:
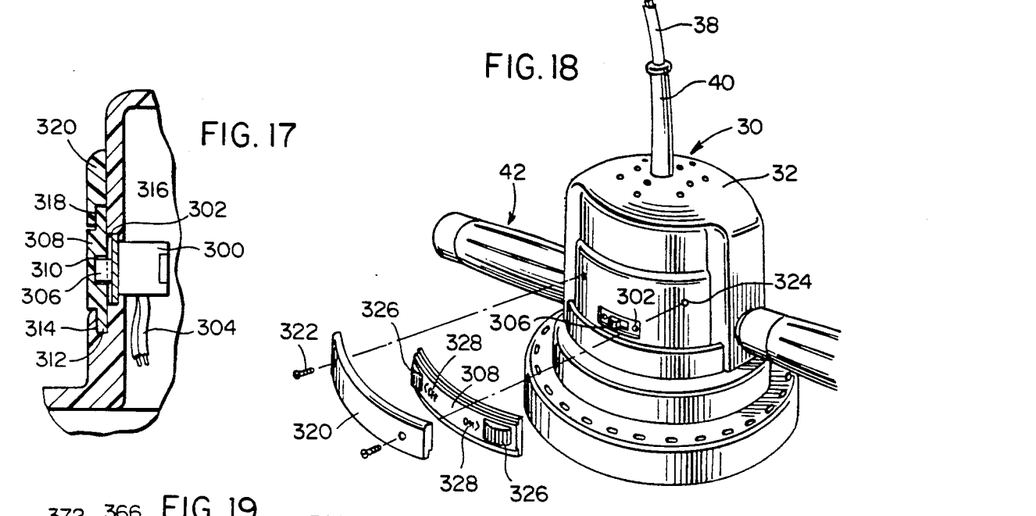
FIG. 17 is a sectional view taken along section line 17—17 on FIG. 1 illustrating structural details of the slide switch assembly.
FIG. 18 is an exploded perspective view of the slide switch assembly.

FIGS. 17 and 18 illustrate the details of the switch assembly 44 which includes a switch body 300 mounted in an opening 302 in the motor housing 32. The switch body includes conductors 304 connected to the motor and supply cord in a conventional manner and includes an outwardly projecting actuator 306 which will turn the motor on or off or the switch may include a plurality of positions to vary the output speed or the motor or may include an infinitely variable speed control in which the actuator moves in a horizontal direction from an off position to an on position. An arcuate slide 308 is provided with a recess 310 in its inner surface which receives the actuator 306 as illustrated in FIG. 17 with the arcuate slide 308 resting against and sliding on the outer surface of the motor housing 32. The lower edge of the slide 308 includes a projecting flange 312 along its inner bottom edge that is slidably received in an upwardly facing groove 314 in the motor housing. The upper edge of the slide 308 is provided with a similar flange 316 which is held captive in a recess 318 in the bottom inner edge of an arcuate retainer 320 which is secured to the motor housing 32 by retaining screws 322 extending through the ends of the slide retainer 320 into apertures 324 in the motor housing. The outer surface of the arcuate slide which actuates the switch is provided with a thumb engaging projection 326 adjacent each end thereof with indicia 328 adjacent each of the projections indicating the direction of movement of the slide 308 to turn the motor on or off or vary the speed thereof. Each of the projections is provided with a pair of opposed inclined surfaces which may be knurled or ribbed to enable an operator gripping the handles 42 to actuate the slide 308 in either direction with either hand thereby enabling the switch to be actuated with equal facility regardless of whether the operator is left handed or right handed. As illustrated in FIG. 1, each of the projections 326 are located in readily accessible position to the thumbs of an operator grasping the handles 42 of the polisher 30.

With the switch assembly 44 as illustrated in FIG. 1 and FIGS. 17 and 18, an operator can turn the polisher on or off with either the left or right thumb thus giving the operator total control and access to the switch while the hands of the operator firmly grasp the handles thus providing a switch actuation assembly that is equally effective whether the operator is left or right handed.

Figures 19, 20, 21:
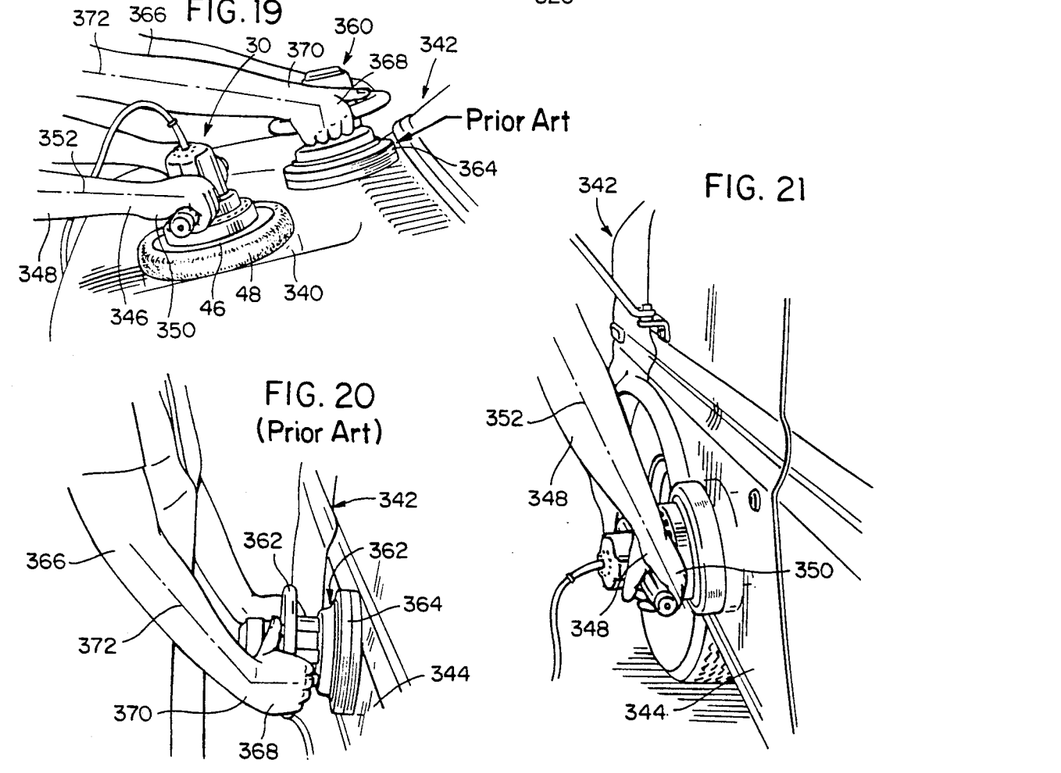
FIG. 19 is a perspective view illustrating the present invention in use alongside of a commercially available rigid handle random orbit polisher to illustrate the differences in the angular position of the hands, arms and wrists when using the present invention as compared to an existing commercially available embodiment of the invention.
FIG. 20 is a perspective view of the commercially available polisher when used on a vertical surface.
FIG. 21 is a perspective view of the present invention utilized on a vertical surface and illustrating the difference in the position of the hands, arms and wrists when using the present invention in FIG. 21 as compared to the prior art device illustrated in FIG. 20 when polishing a vertical surface.

As illustrated in FIGS. 19-21, an operator may effectively polish a horizontal surface 340 such as the hood of a vehicle 342 as illustrated in FIG. 19 or a vertical surface 344 of the vehicle 342 as illustrated in FIG. 21. This enables the polisher 30 including the pad 46 and bonnet 48 to come across the horizontal hook and go right down the vertical side of a fender or the portion of the vehicle without the necessity of positioning the polisher to keep the polishing bonnet 48 in contact with the surface. With the present invention, this operation is automatic and the operator's wrist 346 stays in alignment with the operator's arm 348 and hand 350 which grasps the handle 42. This aligned condition is indicated by a straight reference line or center line 352 in FIGS. 19 and 21 thus illustrating that the wrists of the operator will not be angulated thereby reducing fatigue and reducing the possibility of the operator encountering carpal tunnel syndrome.

In comparison with the polisher 30, FIGS. 19 and 20 illustrate a commercially available prior art polisher generally designated by reference numeral 360 which has a rigid peripheral handle or arcuate handle 362. As illustrated in FIG. 19, the polishing bonnet 364 is in engagement with the same horizontal surface 340 as the polisher 30 of this invention. In this position, the operator has arms 366 and hands 368 in angular relation to each other thus causing the wrists 370 to be angulated as indicated by the reference line 372 in FIG. 19. When the prior art polisher 360 is moved to engagement with the vertical surface 344, the rigid handle 362 is oriented in vertical position thus causing the arms 366 and hands 368 to be angled to a relatively sharp angle in the direction opposite to that in FIG. 19 with the wrists 370 being sharply angled as indicated by the reference line 372 in FIG. 20 thus subjecting the operator to muscular fatigue and introducing the distinct possibility that the operator will suffer from carpal tunnel syndrome due to the hands and arms being angulated at extreme angular positions during many cycles of operation when polishing a vehicle or other surfaces.

With this construction, the limited or unlimited rotational movement of the handles permits the operator to keep his arm, wrist and hands in alignment regardless of the attitude of the surface being polished as clearly illustrated in FIGS. 19-21. By maintaining alignment of the arms, wrists and hands, injury such as carpal tunnel syndrome and excessive twisting of the joints and bones in the arms, wrists and hands of the operator is avoided with this unique feature also greatly reducing operator fatigue.

An additional benefit of the handle structure occurs when the polisher moves from a horizontal to a vertical surface since it is not necessary for the operator to align the polisher pad and bonnet to the surface. With the handle structure of this invention, the handles remain in a fixed position with respect to the hands, wrists and arms of the operator and the polisher pad, bonnet and motor rotate as necessary to permit the polishing pad and bonnet to always be in total contact with the surface being polished. This unique feature eliminates the pad and bonnet from getting on its edge or having only partial contact with the surface which can result in the polisher, pad and bonnet chattering against the surface, bouncing and producing resultant swirl marks. In comparison, in the present invention, the "floating" motor, pad and bonnet are always in correct alignment with the surface being polished. In addition, the operator can turn the polisher on or off with either the left or right thumb in order to give the operator total control and access to the switch while his hands firmly grasp the handles thus rendering the control equally effective regardless of whether the operator is left or right handed. The various embodiments of the handles disclose specific means for providing torsion control including a freely revolving handle incorporating a friction disc optionally and a handle which incorporates increasing resistance if the handle is twisted including coil torsion or torque springs or a flat torsion bar with the torsion bar also contemplating other transverse configurations. The straight wound torsion spring or the oppositely wound torque spring provides for increasing resistance in either direction but none of the springs or torque members contain enough force to interfere with the "floating" action when the operator moves from a horizontal to a vertical surface. The spring loaded structure or torsion bar structure provides return of the spring handle to a center or neutral position automatically when the operator hands are removed from the handles. While FIGS. 19 and 21 illustrate the operator using both hands on the handles, an operator can effectively utilize the polisher by using only one hand which may become necessary when reaching into areas at an extreme arm length. With the rotating handles, the operator can use a single arm to operate and control the polisher while maintaining the arm, wrist and hand in near perfect alignment without experience the "twisting" that would be encountered with a fixed handle such as a handle 362 on the prior art device 360. Thus, with the switch mechanism allowing instantaneous control of the motor by either a right handed or left handed operator and the torsion handle allowing effective operation and control of the polisher, the present invention provides a polisher that can be controlled in a dramatically superior manner as compared to prior art polishers currently on the market.

The polisher pad and bonnet are secured in position in the same manner as existing polishers and the eccentric/counterbalance weight assembly is connected to the motor shaft in a conventional manner. The handle arrangement can be used on random orbit sanders as well as polishers and such units may be either electrically powered or air powered with the handle structure and control structure operating in the same manner. Thus, the unique features of the present invention including the torsion handle structure and the switch or control arrangement can be used with a polisher or other appliances in which the output assembly is oriented in different relationships to the hands, arms and wrists of an operator utilizing the device.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In a polisher having a housing provided with a power output drivingly connected with a polishing pad in which the plane of the polishing pad is in fixed relation to the housing, the improvement comprising handle means on the housing enabling an operator to hold, manipulate and control the polisher, said handle means comprising a pair of opposed torsion handles supported from and extending from opposite sides of the housing, support means for each of said handles, said support means being rigidly connected to the housing and rotatably supporting the handles for rotational movement of the handles in relation to the housing thereby enabling the handles to rotatably support the housing for pivotal movement of the housing and polishing pad while the handles remain rotationally stationary thereby enabling an operator to grasp the handles and maintain the hands, wrists and arms in a straight line position during changes in the angular attitude of the housing and polishing pad whereby the polishing pad may engage horizontal, angular or vertical surfaces while the rotational attitude of the handles with respect to the hands, wrists and arms of the operator remain the same.

2. The polisher as defined in claim 1 wherein said housing includes an external surface extending between the handles, control means for the polisher being mounted on said surface, said control means including a slide member on said surface and extending to areas adjacent the inner ends of the handles whereby the thumb of either the left or right hand of the operator can actuate the slide member to control operation of the polisher with equal facility regardless of the operator being left handed or right handed.

3. The polisher as defined in claim 2 wherein the polisher is electrically powered, said control means including a control switch having a switch actuator extending through the external surface of the housing, said external surface of the housing being arcuate in configuration, said slide member being arcuate in configuration with the slide member including a connection with said switch actuator, each end of the slide member including an outward projection and adjacent indicia indicating the direction of movement of the slide member to control the switch actuator with the projections being engageable by the thumb on either hand of the operator.

4. The polisher as defined in claim 3 wherein said slide member includes a flange along an upper edge thereof and a flange along a lower edge thereof, said surface including inwardly facing grooves slidably receiving the flanges for mounting the slide member on the housing.

5. The polisher as defined in claim 1 wherein each of said handles includes a longitudinally extending handgrip, said support means for each handle including a mounting plug rigidly connected to the housing and a tube rotatably supported in relation to the mounting plus, said handgrip being supported on said tube for rotation therewith to enable the handgrip and tube to be rotatable about a longitudinal axis of the tube.

6. The polisher as defined in claim 5 together with means resisting rotation of the handgrip and tube to provide means to enable the handgrips to remain in stationary position without interfering with pivotal movement of the housing and polishing pad.

7. The polisher as defined in claim 6 wherein said means resisting rotation of the handgrip and tube includes spring resistant means interconnecting the plug and tube to provide a light resistance to rotation of the tube in relation to the plug and to rotatably bias the tube to a neutral centered position whereby the handgrip and tube will return to a predetermined position about its longitudinal axis when released from grasp by the operator thereby assuring that the handgrips will return to a predetermined rotational position in relation to the housing.

8. The polisher as defined in claim 7 wherein said handgrip supporting tube is rotationally supported on an inner tube rigid with said plug, stop means interconnecting the tube supporting the handgrip and the inner tube to limit the rotational movement of the handgrip and handgrip supporting tube in relation to the inner tube.

9. The polisher as defined in claim 8 wherein said spring means is a torsion coil spring, said tube supporting the handgrip including a plug rigid with the handgrip supporting tube and rotatable in relation to the inner tube with the coil spring interconnecting the plugs and resisting rotation of the tube and handgrip supporting tube in relation to the inner tube and plug rigidly connected to the housing.

10. The polisher as defined in claim 7 wherein said spring resistant means is a torsion spring having spiral convolutions extending from end-to-end with all convolutions wound in the same direction.

11. The polisher as defined in claim 10 wherein said housing includes an external surface extending between the handles, control means for the polisher being mounted on said surface, said control means including a slide member on said surface and extending to areas adjacent the inner ends of the handles whereby the thumb of either the left or right hand of the operator can actuate the slide member to control operation of the polisher with equal facility regardless of the operator being left handed or right handed.

12. The polisher as defined in claim 7 wherein said spring resistant means is a torque spring having a plurality of spiral coils at each end thereof with the spiral coils at one end being opposite wound in relation to the other with the coils adjacent the center of the spring being interconnected by a straight portion thus providing equal resistance to rotation of the handgrip in both a clockwise and counterclockwise direction.

13. The polisher as defined in claim 12 wherein said housing includes an external surface extending between the handles, control means for the polisher being mounted on said surface, said control means including a slide member on said surface and extending to areas adjacent the inner ends of the handles whereby the thumb of either the left or right hand of the operator can actuate the slide member to control operation of the polisher with equal facility regardless of the operator being left handed or right handed.

14. The polisher as defined in claim 7 wherein said spring resistant means is a torque bar having one end connected rigidly with the plug that is rigid with the housing and the other end connected to the handgrip supporting tube to resist rotation of the handgrip tube in both a counterclockwise and clockwise direction.

15. The polisher as defined in claim 7 said housing includes an external surface extending between the handles, control means for the polisher being mounted on said surface, said control means including a slide member on said surface and extending to areas adjacent the inner ends of the handles whereby the thumb of either the left or right hand of the operator can actuate the slide member to control operation of the polisher with equal facility regardless of the operator being left handed or right handed.

16. The polisher as defined in claim 15 wherein the polisher is electrically powered, said control means including a control switch having a switch actuator extending through the external surface of the housing, said external surface of the housing being arcuate in configuration, said slide member being arcuate in configuration with the slide member including a connection with said switch actuator, each end of the slide member including an outward projection and adjacent indicia indicating the direction of movement of the slide member to control the switch actuator with the projections being engageable by the thumb on either hand of the operator.

17. A handle assembly for a handheld power device including a housing having a power output for performing a work operation, said housing being oriented in various angular positions when the power device is oriented in different attitudes during a work operation, said handle assembly including a pair of handle members extending outwardly from the housing in opposite directions for grasping by an operator, means supporting said handle members from the housing for rotation about an axis of the handle members whereby the attitude of the housing can vary without rotation of the handle members thereby enabling a person to grasp the handle members when the hands, arms and wrists are in alignment and to maintain this alignment while performing a work operation requiring the angular attitude of the housing to vary thereby avoiding movement of the hands, arms and wrist into angular relation to reduce injury caused by carpal tunnel syndrome and to reduce operator fatigue.

18. A handle assembly for a handheld power device including a housing which is oriented in various angular positions when the power device is oriented in different attitudes during a work operation, said handle assembly including a pair of tubular handle members extending outwardly from the housing in opposite directions and generally in alignment with each other for grasping by an operator, means supporting said tubular handle members from the housing for rotation about the longitudinal axis of the handle member whereby the attitude of the housing can vary without rotation of the handle members thereby enabling a person to grasp the handle members with the hands, arms and wrists in alignment and maintain this alignment while performing a work operation requiring the angular attitude of the housing to vary thereby maintaining alignment of the hands, arms and wrist to reduce injury caused by carpal tunnel syndrome and reduce operator fatigue, said tubular handle members and housing being interconnected by spring means to spring bias the tubular handle members to a neutral, centered position about a longitudinal axis when the handle members are released by the operator.

19. The handle assembly as defined in claim 17 wherein said handle members are elongated tubular members oriented in generally perpendicular relation to the housing and generally in aligned relation on opposite sides of the housing, and resilient means positioned within each tubular member and interconnecting each tubular member and housing to resiliently resist rotation of the tubular members in relation to the housing to enable the handle members to remain in rotationally stationary position without interfering with angular movement of the housing about the longitudinal axis of the handle members during a work operation.

* * * * *